United States Patent [19]

Mikes et al.

[11] 4,091,843

[45] May 30, 1978

[54] FLEXIBLE TUBES FOR HYDRAULIC APPLICATIONS

[75] Inventors: Sandor Mikes; Matyas Timar, both of Szeged; Zoltan Bartha, Budapest, all of Hungary

[73] Assignee: Taurus Gumiipari Vallalat, Budapest, Hungary

[21] Appl. No.: 673,540

[22] Filed: Apr. 5, 1976

[30] Foreign Application Priority Data

Apr. 3, 1975 Hungary .............................. TA 1354

[51] Int. Cl.$^2$ ............................................. F16L 11/08
[52] U.S. Cl. .................................... 138/127; 138/125; 138/126; 138/141; 138/177
[58] Field of Search ............... 138/125, 126, 127, 137, 138/140, 141, 143, 174, 177

[56] References Cited

U.S. PATENT DOCUMENTS

| 2,645,249 | 7/1953 | Davis et al. ........................ 138/141 X |
| 3,420,276 | 1/1969 | Skinner et al. ......................... 138/127 |
| 3,561,493 | 2/1971 | Maillord et al. .................. 138/137 X |
| 3,830,261 | 8/1974 | Hochberg et al. .................... 138/127 |
| 3,927,233 | 12/1975 | Naidoff ............................ 138/178 X |
| 3,944,453 | 3/1976 | Chudgar et al. ................. 138/125 X |

FOREIGN PATENT DOCUMENTS 1,066,962   4/1967   United Kingdom ................. 138/125

*Primary Examiner*—Richard E. Aegerter
*Assistant Examiner*—James E. Bryant, III

[57] ABSTRACT

A technique for producing flexible tubing for use in hydraulic systems employing non-combustible, force-transmitting liquids is described. An inner layer of the tube is formed from a load-carrying metal insert embedded in polychloroprene or natural rubber, which forms a good bond therewith. The exterior, liquid-contacting layers of the tube are formed from ethylene-propylene-terpolymer (EPDM) rubber, which withstands penetration by the hydraulic liquid. A good bond between the interior and exterior layers is provided by an intermediate layer formed from an EPDM-polychloroprene or EPDM-natural rubber mixture, the EPDM constituent being present in a proportion of about 50–80%. The transition layer may be embedded with a polymer-impregnated textile, either of cotton or of a synthetic substance such as rayon, polyamide or polyester.

1 Claim, 1 Drawing Figure

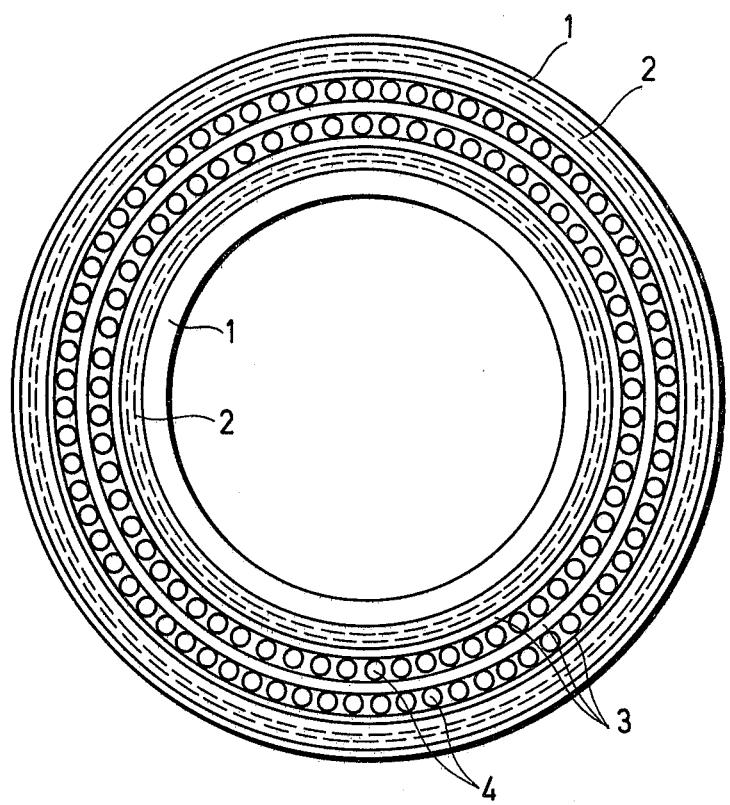

FLEXIBLE TUBES FOR HYDRAULIC APPLICATIONS

BACKGROUND OF THE INVENTION

The invention relates to methods of producing flexible, vulcanizable composite tubing for applications in a hydraulic system that employs a non-combustible, force-transmitting fluid. The invention also relates to tubing produced by such methods.

Hydraulic systems which employ, as the force-transmitting medium, a non-combustible liquid (e.g., liquids derived from phosphate esters) are by nature much less hazardous than systems employing petroleum-based hydraulic fluids, which are highly flammable. The use of systems employing such non-combustible fluids, has the disadvantage of severely complicating the construction of the flexible tubing elements that must be present in such systems to compensate relative movement of the force-transmitting and force-receiving elements. Such complication arises from the fact that the rubber-type substance which must be embedded in the steel insert that forms the load-bearing interior layer of such tubes to form an efficient bond therewith, is damaged by contact with the phosphate esters forming the base of the non-corrosive hydraulic fluid.

On the other hand, substances such as ethylene-propylene-terpolymer (EPDM) rubber and natural rubber, which are essentially impervious to the phosphate esters in the hydraulic fluid, are incapable of forming, with metal inserts of the flexible tube, the required bond necessary to assure structural integrity and efficient operation of the tube.

SUMMARY OF THE INVENTION

The technique of the present invention provides, for use in hydraulic applications employing non-combustible phosphate ester-based hydraulic fluids, a flexible composite tube having a plurality of layers which can be bonded together to exhibit a characteristic that is both highly resistant to penetration and damage by the non-combustible hydraulic fluid and which exhibits a high-strength interior region containing an efficiently bonded rubber-metal composite layer of the type indicated above. Illustratively, the improved flexible tubing of the invention is formed from an innermost layer or layers consisting of metallic insert embedded with a polychloroprene or natural rubber base mixture, an exterior layer spaced from the innermost layer and formed from ethylene-propylene-terpolymer (EPDM) rubber, and an intermediate layer formed from a combination of EPDM rubber and either polychlorophene and natural rubber.

In a feature of the invention, the intermediate transition layer has embedded therein a natural or synthetic textile impregnated with a bond-increasing agent, such agent illustratively consisting of the embedded material in the innermost layer, i.e., polychloroprene or natural rubber. The textile may illustratively be of cotton, rayon, polyamide or polyester.

BRIEF DESCRIPTION OF THE DRAWING

The invention is further set forth in the following detailed description taken in conjunction with the appended drawing, in which the single FIGURE is a cross-section of a flexible composite tube having a plurality of layers whose composition is selected in accordance with the invention.

DETAILED DESCRIPTION

The vulcanizable, composite flexible tubing illustrated in FIG. 1 is adapted to be employed in a hydraulic system using a non-combustible hydraulic fluid, e.g., of the phosphate ester variety. In order to insulate the load-bearing interior of the jacket from harmful effects caused by penetration of the non-combustible fluid, a pair of inner and outer exterior layers 1, 1 thereof are illustratively formed from ethylene-propylene-terpolymer (EPDM) rubber. In addition to withstanding penetration by the hydraulic fluid, the EPDM composition is also highly weather-resistant.

The innermost, load-bearing portion of the illustrated tubing is depicted as a system of steel wire inserts 4, 4 into which are embedded layers 3, 3 of polychloroprene or natural rubber, such substances having a high bonding affinity for the metal inserts. The resultant, intimately bonded interior structure of the tube exhibits high structural integrity and great strength, while preserving the flexibility needed in the tubing to compensate or equalize relative movements in the force-transmitting and force-receiving portions of the non-illustrated, associated hydraulic system. Disposed between the exterior layers 1, 1 and the composite, load-bearing innermost layers 3, 4 are a pair of transition layers 2, 2 which perform the dual function of (1) providing supplementary protection against the diffusion of the phosphate-ester hydraulic fluid into the innermost layers 3, 4, and (2) providing an efficient bond to the innermost layers 3, 4 in order to enhance the structural integrity of the tube.

For this purpose, each of the transition layers 2 contains a base substance of 50–80% EPDM and the remainder polychloroprene or natural rubber. Advantageously, each of the transition layers 2 may also include an embedded textile element which is impregnated with a suitable bond-promoting polymer, such as the polychloroprene or natural rubber forming the embedding layers 3 for the metallic inserts 4. For example, the textile may consist of rayon, polyamide or polyester thread. Alternatively, the textile insert may consist of cotton which has been impregnated, e.g., in a 10-20% organic solution of an EPDM-chloroprene mixture.

The manufacture of the various layers of the flexible tube illustrated may involve the conventional steps of extruding, calendaring, etc., which are well-known to those skilled in the art and will not be discussed further here. It is also understood that, to complete the manufacturing operation, each of the easily vulcanizable layers 1, 2 and 3 of the composite tubing will be vulcanized together before use.

In the broadest aspects of the invention, only one (metal-rubber) innermost layer 3, 4 need be provided in the tube. Also, in place of the double cladding of the transition layers 2 on the innermost layer 3, 4, it may be expedient in certain applications to coat only one side of the composite layer 3, 4 with the transition layer 2, with the opposite surface of such composite layer being coated with more highly-bondable materials, such as additional layers of natural rubber or polychloroprene.

In the foregoing, an illustrative technique and product of the invention have been described. Many variations and modifications will now occur to those skilled in the art. It is accordingly desired that the scope of the appended claims not be limited to the specific disclosure herein contained.

What is claimed is:

1. As a new article of manufacture, a flexible composite tube comprising a core formed from ethylene-propylene-terpolymer rubber, a first transition layer bonded to the exterior surface of the core and formed from a textile selected from the group consisting of rayon, polyamide, polyester and cotton impregnated with a bond-increasing agent selected from the group consisting of polychlorophene and natural rubber and embedded within a first mixture containing about 50–80% ethylene-propylene-terpolymer rubber and the remainder selected from the group consisting of polychloroprene and natural rubber, the first mixture in the first transition layer being in contact with the underlying exterior surface of the core, a load-bearing layer bonded to the exterior surface of the first transition layer and in contact with the first mixture in the underlying first transition layer, the load-bearing layer consisting of a metal insert embedded within an adherent substance selected from the group consisting of polychloroprene and natural rubber, a second transition layer bonded to the exterior surface of the load-bearing layer and formed from a textile selected from the group consisting of rayon, polyamide, polyester and cotton impregnated with a bond-increasing agent selected from the group consisting of polychlorophene and natural rubber and embedded within a second mixture containing about 50–80% ethylene-propylene-terpolymer rubber and the remainder selected from the group consisting of polychloroprene and natural rubber, the second mixture in the second transition layer being in contact with the exterior surface of the underlying load-bearing layer, and an outer jacket bonded to the exterior surface of the second transition layer and in contact with the second mixture in the second transition layer, the outer jacket being formed from ethylene-propylene-terpolymer rubber.